United States Patent
Zheng et al.

[11] Patent Number: 5,432,824
[45] Date of Patent: Jul. 11, 1995

[54] CREDIT/RATE-BASED SYSTEM FOR CONTROLLING TRAFFIC IN A DIGITAL COMMUNICATION NETWORK

[75] Inventors: Qin Zheng, Belmont; Hugh C. Lauer, Concord; John H. Howard, Cambridge, all of Mass.

[73] Assignee: Mitsubishi Electric Research Laboratories, Inc., Cambridge, Mass.

[21] Appl. No.: 271,418

[22] Filed: Jul. 6, 1994

[51] Int. Cl.⁶ .................................................. H04L 7/00
[52] U.S. Cl. ........................................ 375/356; 370/84
[58] Field of Search .................... 379/112, 113; 375/8, 375/122, 107; 370/84

[56] References Cited

U.S. PATENT DOCUMENTS 5,319,638  6/1994  Lin ......................................... 370/84
5,367,523  11/1994  Chang et al. ........................... 370/84

Primary Examiner—Stephen Chin
Assistant Examiner—Kevin Kim
Attorney, Agent, or Firm—Robert K. Tendler

[57] ABSTRACT

A system for controlling traffic in a digital communication network to avoid data loss due to congestion utilizes both credit-based and rate-based traffic control approaches within a common framework, and adjusts the rate at which data is transmitted from a source in accordance with feedback in a form of credit values from a destination reflecting the ability of the network to transmit data and the destination to receive data. In one embodiment, the destination receives the information about network congestion, and, knowing its own capacity to receive more data, generates a credit in the form a numeric value which is fed back to the source so that the source adjusts its transmission rate to avoid data loss due to congestion in the network.

12 Claims, 2 Drawing Sheets

CREDIT/RATE-BASED SYSTEM FOR CONTROLLING TRAFFIC IN A DIGITAL COMMUNICATION NETWORK

FIELD OF THE INVENTION

This invention relates to traffic control in a digital communication network and more particularly to a system for controlling data transmission to minimize data loss while accommodating bursty data traffic.

BACKGROUND OF THE INVENTION

In a transmission of data over a digital communication network, such as an asynchronous transfer mode or ATM network, problems arise when multiple sources send data cells or packets at widely varying rates through a switch node or link of the network at an aggregated rate which taxes the ability of that switch node or link to handle the data. Congestion occurs at the node of a network when data arrives at the node at a rate exceeding the rate at which the node can process and forward the data to other nodes. The excess data then accumulates in buffer storage at the node, which fills at a rate which is the difference between the arrival rate and the processing and forwarding rate. If the congestion persists for long periods of time, the buffer storage will be filled to maximum capacity and any additional data must be discarded.

In an effort to minimize such data loss, there are two types of systems which have been used at a source to prevent or inhibit excess data from entering the network. One such system is a rate-based system in which the rate at which the data is permitted to enter the network is adjusted via a feedback signal from a destination reflecting the overall congestion of the network. This congestion of the network is typically denoted by one bit in the header of each cell or packet. It will be noted that this feedback signal contains only one bit of information. Thus only congestion or non congestion can be ascertained, and not the degree of congestion. As a result the rate at which cells are transmitted can never be properly adjusted to the degree of congestion. Moreover, rate-based systems in general do not guarantee that the data will not be lost because the rate adjustment alone is not effective to completely prevent congestion due to unexpected data bursts, commonly referred to as bursty data. Since the data rate of the source can not be adequately adjusted based solely on an average level of congestion, data loss can not be completely avoided.

A competing system for controlling data transmission which guarantees lossless transmission does in fact take into account the state of the destination and the states of all the nodes between the source and the destination by issuing a so-called credit to the source. The credits are generated starting at a destination node to reflect its ability to receive data. This credit is transmitted back to the next upstream node where this credit is interpreted and modified based on this node's ability to receive data. The process continues through each intermediate node back to the source where the credit at the source reflects all intermediate credits as well as the one from the destination. Typically the credits reflect the unused buffer space at each node. The source then interprets the credit as an indication of the amount of data that it can transmit into the network without any data loss due to congestion or buffer overflow. Note that data rate is not controlled, but the number of cells transmitted is controlled. As will be appreciated, this system requires an increase in the amount of processing at each network node. As a result, there has been substantial resistance on the part of manufacturers to increase the processing power at a switch node due in part to cost. Moreover, requiring all nodes to use the credit-based scheme would necessitate the replacement of most existing network switch nodes, which would obsolete not only the present equipment but also much engineering investment.

There is therefore a need for flexibility in the design of a traffic control system which can accommodate both the rate-based and credit-based systems, while at the same permitting the evolution of traffic control from a rate-based system to a credit-based system, or to a combination of the two.

More particularly, two principal traffic control schemes for bursty data are currently being considered by the industry: a Rate-Based (RB) scheme such as described by Yin and Hluchyj in an article entitled "On Closed-Loop Rate Control for ATM Cell Relay Networks" published in IEEE Infocom '94 Conference, Toronto, Canada, June, 1994, and a Credit-Based (CB) scheme such as described by Kung and Chapman in an article entitled "The FCVC (Flow-Controlled Virtual Channels) Proposal for ATM Networks: A Summary" published in Proceedings of 1993 International Conference on Network Protocols, San Francisco, Calif., Oct. 19–22 1993.

The rate-based scheme employs an end-to-end closed-loop flow control approach by requiring sources to adjust their transmission rates according to the feedback information sent back from destinations or segmentation points. The credit-based scheme uses a link-by-link flow control approach such that an upstream node does not send cells unless it knows that buffer space is available at a downstream node.

Each scheme has its advantages and disadvantages. The rate-based scheme relies on end systems to do traffic control. Thus very little intelligence and participation are required on the part of switch nodes of ATM networks. Also, the rate-based paradigm is in accordance with the current standards for ATM traffic management to be implemented on network interface hardware. However, the issues of performance and its ability to react to congestion have been raised about the rate-based scheme. There is no analytical proof or real world experience showing that the rate-based scheme will be able to provide satisfactory performance and minimize cell losses of bursty traffic.

The credit-based scheme, on the other hand, has a solid proof that lossless transmission can be achieved. With its static buffer allocation algorithm, it can also achieve the maximum link bandwidth utilization. However, since the credit-based scheme requires coordination and active participation of all switches in a path, significant changes to the architecture of the existing ATM switches are needed. The switch implementation cost, in terms of processing power and buffer requirement, is also of concern. Thus a main concern about the credit-based scheme is whether or not the scheme is mature enough for wide spread implementation.

SUMMARY OF INVENTION

In order to accommodate both rate-based system architecture and credit-based system architecture, a unified system for controlling traffic in a digital communication network to avoid data loss due to congestion utilizes a uniform protocol incorporating features of both the rate-based systems and credit-based systems to feedback information from the destination to the source. Such information is then used to control the rate of data transmission through the use of credits reflecting the ability of the network to transmit data and the destination to receive data.

Specifically, a system is provided for controlling traffic in a digital communication network to avoid data loss due to congestion by utilizing both credit-based and rate-based control traffic control schemes and adjusting the rate at which data is transmitted from a source in accordance with feedback in a form of credit value from a destination reflecting the ability of the network to transmit data and the destination to receive data. In one embodiment, the destination receives the information about network congestion, and, knowing its own capacity to receive more data, generates a credit in the form a numeric value which is fed back to the source so that the source adjusts its transmission rate to avoid data loss due to congestion in the network.

The subject system is configured by providing one or more functions at the source to control data rate and by providing a credit value update rule at the destination. The functions for rate setting vary with the application, as do the rules. The hybrid scheme of using credit values to control data rate results in much improved and flexible traffic control systems. However, if completely lossless transmission is desired, that part of the network can be quickly reconfigured via changes of functions and rules for the nodes involved to reflect a pure credit based scheme. Likewise, where lossy transmission of data can be tolerated, the nodes can be reconfigured with the rate-based functions and rules. Thus while a hybrid system is described, the system can be reconfigured for any appropriate functions and rules without physically changing or obsoleting the nodes.

The subject system permits the gradual introduction of a credit-based system on a node-by-node basis into existing networks without having to replace every switch node in a network. Additionally, the subject system provides more information on which to set transmission rate in an existing rate-based networks since more information as to the condition of the destination is utilized in the rate setting. Moreover, the subject system is open-ended to permit additional functional functions and features to be added without requiring architectural changes to the network. Most importantly, the subject system does not add significant implementation complexity at a network interface card over that of a rate-based or credit-based scheme alone. This also allows networks to simultaneously use different traffic control schemes between different sources and destinations.

BRIEF DESCRIPTION OF DRAWINGS

These and other features of the subject invention will be better understood in conjunction with the Detailed Description taken in conjunction with the Drawings of which.

DETAILED DESCRIPTION

Figure 1:
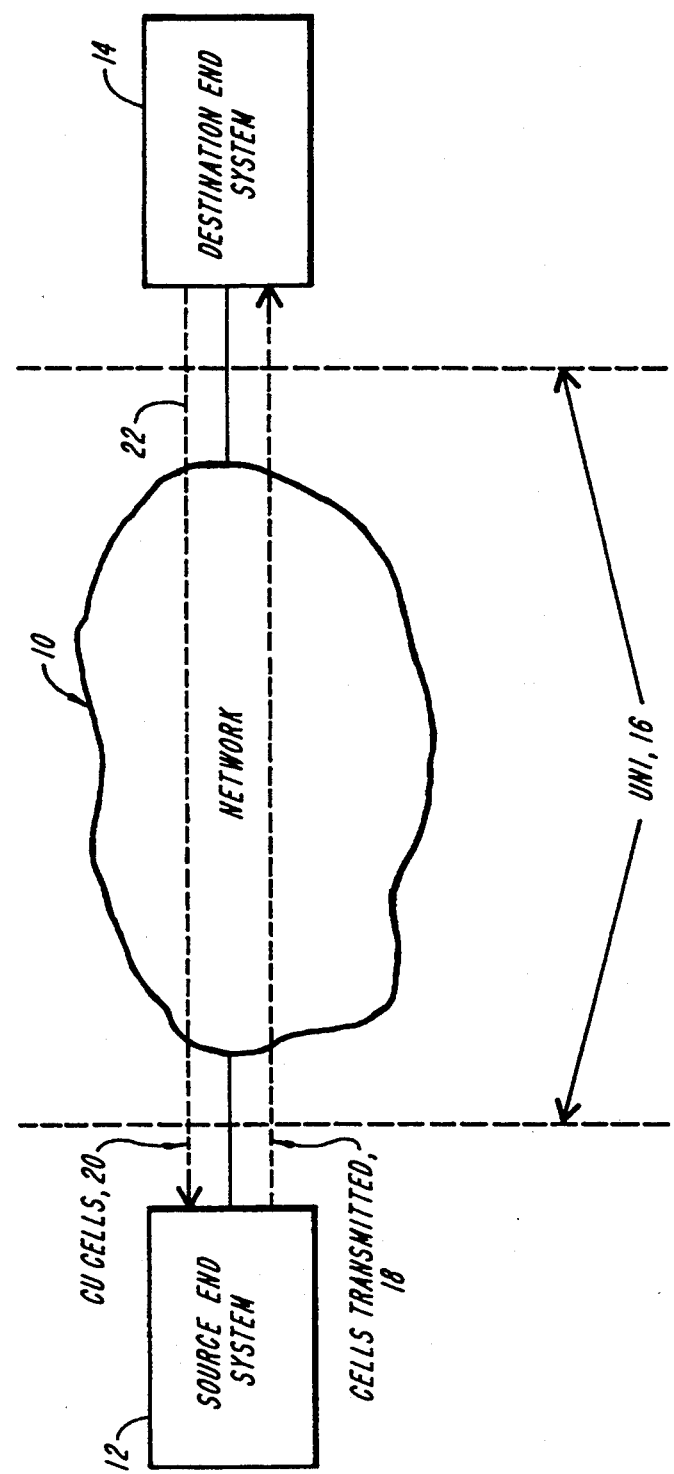
FIG. 1 is schematic diagram illustrating a network having a source from which cells of data are transmitted through the network to a destination through user network interfaces, in which credit update cells, or CU cells are transmitted from a destination to the source to control the rate at which data cells are transmitted.

Referring now to FIG. 1, a network 10 is utilized to connect a source 12 to a destination 14 by providing a user network interface or UNI 16. The source transmits data cells as indicated by dotted line 18 to the destination, with credit update cells or CU cells 20 being transmitted back to the source through the network as illustrated by dotted line 22.

Figure 2:
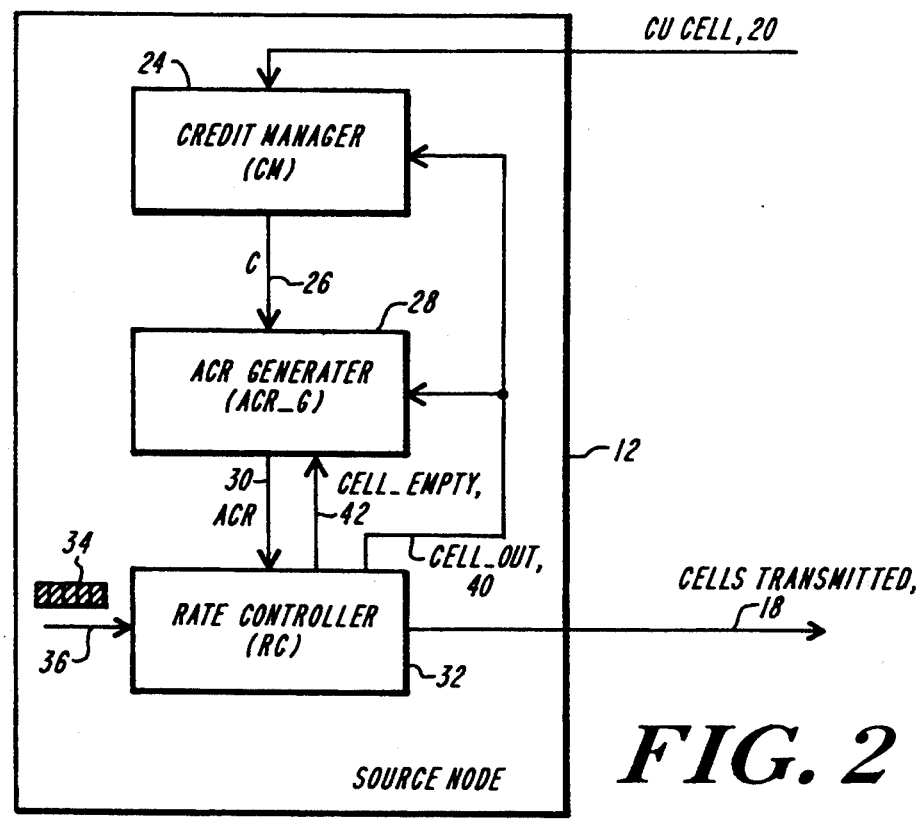
FIG. 2 is a block diagram of the source end system of FIG. 1 in which credit update cells reflecting the state of the destination and the network are applied to a credit manager which in turn generates a credit value applied to an allowed cell rate generator which in turn provides a signal corresponding to the allowed cell rate to a rate controller which governs the rate of transmission of data cells; and, FIG. 3 is a block diagram illustrating the destination end system of FIG. 1 in which incoming data cells are analyzed by an incoming cell accountant for generating a numerical value reflective of the amount of free buffer space available at a destination node and the network congestion status indicated by a bit in each received cell, with this value being utilized by a credit update cell generator to generate credit update cells for transmitting to the credit values back through the network to the source.

Referring now to FIG. 2, credit update cells are applied to a credit manager or CM 24 which generates a signal C applied over line 26 to an allowed cell rate generator or ACR_G 28, with generator 28 having an output over line 30 to provide an allowed cell rate value, ACR, to be applied to a rate controller or RC 32 which controls the rate at which cells 34 at the input 36 to rate controller 32 are permitted to be transmitted over line 18. Each time a cell is transmitted, the fact of this transmission is indicated to both generator 28 and credit manager 24 via a "cell out" signal applied to line 40. If at the time a cell is to be transmitted, there is no cell waiting, a signal representing "empty cell" is coupled to generator 28 over line 42.

In operation, the credit manager maintains a credit count based on the credit update cells received, diminished by the number of cells transmitted. Allowed cell rate generator 28 adjusts the value from the credit manager 24 to reflect both the cells transmitted and the fact of an cell empty condition.

Figure 3:
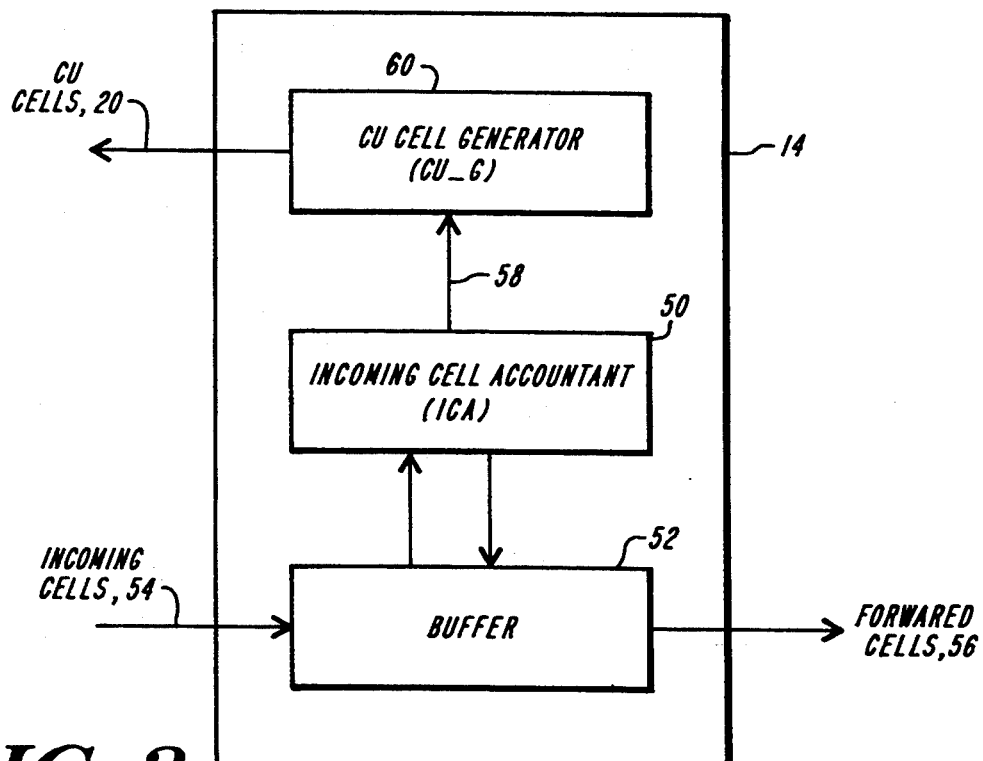

Referring now to FIG. 3, destination 14 includes an incoming cell accountant or ICA 50 coupled to a buffer 52 to which incoming cells 54 are applied and from which forwarded cells 56 are outputted to the application consuming the data, not shown. The incoming cell accountant determines, at any given time, the free space in buffer 52, along with the status of the incoming cells as to the congestion of the network. This congestion is typically indicated by a predetermined bit, called the explicit forward congestion indication bit or EFCI bit, in the header of each incoming data cell. The output of the cell accountant 50 is a value reflecting the ability of the destination to accept and process incoming cells without loss of data. This value is applied over line 58 to a credit update cell generator or CU_G 60 which generates credit update cells 20 to be transmitted through the network to the source. The value generated by incoming cell accountant 50 is thus transmitted to the source in packet or cell form.

More particularly, the subject invention has the following basic and mandatory elements:

A source end system must maintain a credit count C for each connection or virtual channel. A virtual channel is a logical stream of data from one application in the source to one application in the destination. C is updated upon transmission of data cells and reception of credit update cells. Secondly, the cell transmission rate of a virtual channel is controlled not to exceed an allowed cell rate for that virtual channel. This is implemented by a mechanism which dynamically updates the allowed cell rate.

A destination end system must keep a record for each virtual channel of the numbers of cells received and their congestion status, i.e., whether or not the explicit forward congestion indication bit is set. Secondly, the credit update cells for each virtual channel are assembled according to the number and/or status of cells received and the number of cells forwarded. Thereafter, credit update cells are sent back to the source of that virtual channel.

A network operator may optionally provide the following at a network node:

First, a congested switch sets the explicit forward congestion indication bits of cells passing through it to convey congestion information to downstream nodes. Secondly, the switch may implement functions specified for source and destination end systems such that it is capable of behaving as a virtual source and destination.

As a detailed definition of source end system behavior, the traffic control functions of a source end system are to be implemented with the three modules as shown in FIG. 2. As discussed above, credit manager 24 maintains a credit count C for each virtual channel. Allowed cell rate generator 28 calculates the current allowed cell rate for each virtual channel, and rate controller 32 controls the transmission rate of a virtual channel not to exceed its current allowed cell rate.

The following is a program listing for credit manager 24:

```
if (receive CU cell)
    derive a credit update value dC
    from the CU cell
    C:=min (C_max, C+dC)              ! credit update
    send C to ACR_G                   ! initiate an ACR update
if (receive a cell_out signal from RC) ! one cell is transmitted
    C:=max(0, C−1)                    ! credit update
```

The following is a program listing for allowed cell rate generator 28:

```
if (C is updated from CU cell)        ! ACR calculation for
    ACR:=f1(C)                        ! a new credit value
if (C updated from cell_out signal)   ! ACR calculation upon
    ACR:=f2(C)                        ! transmission of a cell
if (receive an cell_empty signal)     ! ACR calculation at the
    ACR:=f3(C)                        ! next cell transmission
                                      ! time when a VC is idle
``` where f1(), f2(), f3() are specified as discussed later.

The following is a program listing for rate controller 32:

```
if (current_time >= next_cell_time)
    next_cell_time := current_time + 1/ACR
    if a cell is available
        transmit a cell
        send a cell_out signal to CM and ACR_G
    else
```

```
        send an cell_empty signal to ACR_G
```

As to the behavior of the destination end system, as shown in FIG. 3, a destination end system includes two modules for traffic control: an incoming cell accountant 50 and a credit update cell generator 60. The incoming cell accountant 50 maintains three counters for each virtual channel: the total number of cells received N_in, the total number of cells forwarded N_out, and the number of continuous congestion-free cells received N_cf. According to these variables, the credit cell generator generates credit cells using a set of rules selected by the virtual channel.

The program listing for the incoming cell accountant 50 is as follows:

```
if (receive cell)
    N_in := N_in + 1
    if (EFCI bit = 0)
        N_cf := N_cf + 1
    else
        N_cf := 0
if (forward cell)
    N_out := N_out + 1
```

The program listing for the credit update cell generator 60 is as follows:

```
if (RULE(N_in, N_out, N_cf, N_in_old, N_out_old,
N_cf_old) = TRUE)
    assemble a CU cell
    send the CU cell to a node specified by the VC
    N_in_old := N_in
    N_out_old := N_out
    N_cf_old := N_cf
``` where RULE() is specified as discussed below.

The flexibility and ability of the subject invention to accommodate various traffic control schemes comes from the freedom in implementing f1(), f2(), f3() at the source, and RULE() at the destination. It can be demonstrated that the prior art rate-based and credit-based schemes can both be implemented by a network interface complying with the subject invention.

As for implementing the rate-based scheme, f1(), f2(), f3(), and RULE() are defined as follows:

$$\text{RULE}() = (((N\_in \bmod Nrm) == 0) \& (N\_cf > 0))$$

$$f1() = \min(ACR + Nrm*AIR + Nrm*ADR, PCR)$$
where ADR=ACR/MDF $$f2() = \max(ACR - ADR, MCR)$$

$$f3() = \max(ACR - ADR, MCR) \text{ if } ACR > ICR \text{ and } ACR \text{ otherwise}$$

where, as described in "Closed-Loop Rate-Based Traffic Management", ATM Forum/94-0438R1, July 1994, ACR is the Allowed Cell Rate, ADR is the Additive Decrease Rate, AIR is the Additive Increase Rate, MCR is the Minimum Cell Rate, the minimum for ACR, ICR is the Initial/reset Cell Rate for ACR, PCR is the Peak Cell Rate, the maximum rate for ACR, MDF is the Multiplicative Decrease Factor, and Nrm is a constant number which determines the frequency that feedback cells are generated.

As for implementing the credit-based scheme, f1(), f2(), f3(), and RULE() are defined as follows:

RULE()=(N_out−N_out_old> =N2)

f1()=f2()=PCR if C>0 and 0 otherwise f3()=ACR where PCR is the Peak Cell Rate, the maximum rate for ACR, and N2 is a constant number which determines the frequency that feedback cells are generated.

It will be appreciated that the subject system may be adopted in its entirety, or it may be adopted at some nodes of a digital network so that for applications requiring absolutely no data loss, the above credit-based system can be implemented without change to the network as a whole except for those nodes dedicated to a no loss application between the corresponding application source and the application destination. Thus existing networks need not be totally reconfigured when only a portion of the network need be devoted to applications requiring absolutely no data loss. Moreover, one source call connect to a destination using a particular set of functions f1(), f2(), f3(), and RULE(); and the same source can connect to a different destination using a different set of functions f1'(), f2'(), f3'(), and RULE'(). For example, a source can transmit data to one destination using a rate-based method of avoiding data loss. The same source can also, at the same time, transmit other data to a different destination using tile credit-based method of avoiding data loss. More importantly, the data from this source can be transmitted to a destination via the subject system by combining credit-based and rate-based methods in which lossless transmission is achieved through a hybrid form of rate adjustment. Note, the subject system is quickly configurable, merely by changing the functions and rules at the respective sources and destinations. This permits expansion of existing systems and the provision of new systems with much more flexibility in handling bursty data traffic.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A system for controlling data transfer in a connection-oriented network which controls the flow of data associated with a particular connection in a digital communication network to avoid data loss, comprising:
 a source for transmitting incoming data cells over said network, said network including a number of intermediate nodes and a destination for said data associated with said connection;
 means at said destination for receiving said data and for generating a credit value based on the ability of said destination to receive data, said credit value also being reflective of the ability of intermediate nodes associated with said connection to receive data; and,
 means at said source and responsive to said credit value for adjusting the rate at which said source transmits data, said means for adjusting said rate including a credit manager for receiving said credit values and for generating a credit, an allowed cell rate generator coupled to said credit generator for generating an allowed credit signal, and a rate controller coupled to said allowed cell rate signal and to said incoming data cells for adjusting the rate at which said incoming data cells are transmitted.

2. The system of claim 1 wherein said rate adjusting means include predetermined functions at said source for setting said data rate and a predetermined function at said destination for controlling the generation of said credit value.

3. The system of claim 2 wherein said functions at said source and said destination set said data rate below a maximum calculated from said credit value.

4. The system of claim 2 wherein said functions at said source and said destination are rate-based system functions.

5. The system of claim 1 and further including means at said source and said destination for controlling the transmission of data over said network in accordance with a credit-based system function.

6. The system of claim 2 wherein said source includes means for selecting one of said functions for setting said data rate, and wherein said destination includes means for selecting one of said functions for controlling said generation of said credit value.

7. The system of claim 6, and further including means at said source and said destination for controlling the transmission of data over said network in accordance with a credit-based system function, whereby said functions at said source and said destination include both rate-based system functions and credit-based system functions.

8. The system of claim 1 wherein each of said intermediate nodes includes means for generating a congestion indicating signal indicative of the ability of the respective node to receive and forward data, and wherein said destination includes means for receiving the congestion indicating signals from all upstream nodes and for altering the credit value generated at said destination to reflect said upstream congestion, whereby the rate at which data is transmitted from said source is adjusted based on overall network congestion from source to destination.

9. The system of claim 1 wherein said rate controller includes means for generating a cell out signal reflecting the transmission of a cell of data to said network and means for coupling said cell out signal to said credit manager for diminishing said credit by the number of cells transmitted.

10. The system of claim 9 and further including means for coupling said cell out signal to said allowed cell rate generator.

11. The system of claim 10 wherein said rate controller includes means for generating an empty cell signal reflecting the fact of no cell waiting as input data and means for coupling said empty cell signal to said allowed cell rate generator.

12. The system of claim 11 wherein said allowed cell rate generator includes means coupled to said cell out signal and said empty cell signal for adjusting the allowed cell rate responsive to both signals.

* * * * *